US 11,528,752 B2

(12) United States Patent
Wang (10) Patent No.: US 11,528,752 B2
(45) Date of Patent: Dec. 13, 2022

(54) RANDOM ACCESS CONTROL METHOD AND APPARATUS, NETWORK DEVICE, AND TERMINAL (71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 12 days.

(21) Appl. No.: 17/171,964

(22) Filed: Feb. 9, 2021

(65) Prior Publication Data
US 2021/0168877 A1    Jun. 3, 2021

Related U.S. Application Data (63) Continuation of application No. PCT/CN2018/107025, filed on Sep. 21, 2018.

(51) Int. Cl.
*H04W 74/08* (2009.01)
*H04W 76/27* (2018.01)

(52) U.S. Cl.
CPC ....... *H04W 74/0833* (2013.01); *H04W 76/27* (2018.02)

(58) Field of Classification Search
None
See application file for complete search history.

(56) References Cited

U.S. PATENT DOCUMENTS

| 2018/0110074 A1* | 4/2018 | Akkarakaran .... H04W 74/0833 |
| 2018/0205516 A1* | 7/2018 | Jung ................. H04W 74/0833 |
| 2018/0279186 A1* | 9/2018 | Park ................. H04W 36/0077 |
| 2018/0279375 A1* | 9/2018 | Jeon ................. H04W 74/0833 |

(Continued)

FOREIGN PATENT DOCUMENTS

| CN | 106899964 A | 6/2017 |
| CN | 108064050 A | 5/2018 |

(Continued)

OTHER PUBLICATIONS

Extended European Search Report issued in corresponding European Application No. 18933933.6, dated Oct. 6, 2021, 9 pages.

(Continued)

*Primary Examiner* — Jamaal Henson
(74) *Attorney, Agent, or Firm* — Bayes PLLC (57) ABSTRACT

Embodiments of the present disclosure provide a random access control method and apparatus, a network device and a terminal. The method includes: sending, by a network device, a first system broadcast message, where the first system broadcast message includes a first indication information that is used for indicating whether a target cell of a terminal supports a 2-step random access process; and sending, by the network device, a second system broadcast message, where the second system broadcast message includes access control information corresponding to the 2-step random access process; the first indication information and the access control information are used by the terminal to determine whether the 2-step random access process is allowed to be performed.

20 Claims, 5 Drawing Sheets (56) References Cited

U.S. PATENT DOCUMENTS

2019/0223157 A1\* 7/2019 Hwang ............ H04L 27/26025
2020/0045742 A1  2/2020 Suzuki et al.

FOREIGN PATENT DOCUMENTS

| CN | 108271275 A | 7/2018 | |
|---|---|---|---|
| CN | 108282816 A | 7/2018 | |
| CN | 108282899 A | 7/2018 | |
| EP | 2816844 A1 \* | 12/2014 | ............ H04W 48/12 |
| WO | 2017222327 A1 | 12/2017 | |
| WO | 2018085726 A1 | 5/2018 | |
| WO | WO-2018085726 A1 \* | 5/2018 | |
| WO | 2018135631 A1 | 7/2018 | |
| WO | WO-2018175809 A1 \* | 9/2018 | ........ H04W 36/0077 |
| WO | 2020/056736 A1 | 3/2020 | |

OTHER PUBLICATIONS

PCT Written Opinion of The International Searching Authority issued in corresponding International Application No. PCT/CN2018/107025, dated Apr. 28, 2019, 6 pages.

\* cited by examiner

RANDOM ACCESS CONTROL METHOD AND APPARATUS, NETWORK DEVICE, AND TERMINAL

CROSS-REFERENCE TO RELATED APPLICATIONS

This application is a continuation of International Application No. PCT/CN2018/107025, filed Sep. 21, 2018, entitled "RANDOM ACCESS CONTROL METHOD AND APPARATUS, NETWORK DEVICE, AND TERMINAL", the entire contents of which is incorporated herein by reference.

BACKGROUND

The present disclosure relates to the field of mobile communication technology, and in particular to a random access control method and apparatus, network device, and terminal.

In order to shorten a time delay of the random access process and quickly enter the network to start service, a 2-step random access channel (referred to as 2-step RACH) is proposed. In the 2-step RACH, MSG3 resources are pre-configured. Since the pre-configured resources are limited, to avoid waste of resources, the 2-step RACH will not be open to all UEs and/or all services. The problem to be solved is how to control the UEs to adopt the 2-step RACH.

SUMMARY

Embodiments of the present disclosure provide a random access control method and apparatus, a network device and a terminal.

An embodiment of the present disclosure provides a random access control method, including sending, by a network device, a first system broadcast message, where the first system broadcast message comprises a first indication information, and the first indication information is used for indicating whether a target cell of a terminal supports a 2-step RACH; and sending, by the network device, a second system broadcast message, where the second system broadcast message comprises access control information corresponding to the 2-step RACH; where the first indication information and the access control information are used by the terminal to determine whether the terminal is allowed to perform the 2-step RACH.

An embodiment of the present disclosure provides a random access control method, including receiving, by a terminal, a first system broadcast message, where the first system broadcast message comprises a first indication information, and the first indication information is used for indicating whether a target cell of a terminal supports a 2-step RACH; and receiving, by the terminal, a second system broadcast message, where the second system broadcast message comprises access control information corresponding to the 2-step RACH; where the first indication information and the access control information are used by the terminal to determine whether the terminal is allowed to perform the 2-step RACH.

An embodiment of the present disclosure provides a random access control apparatus, including a first sending unit, configured to send a first system broadcast message, where the first system broadcast message comprises a first indication information, and the first indication information is used for indicating whether a target cell of a terminal supports a 2-step RACH; and a second sending unit, configured to send a second system broadcast message, wherein the second system broadcast message comprises access control information corresponding to the 2-step RACH; where the first indication information and the access control information are used by the terminal to determine whether the terminal is allowed to perform the 2-step RACH.

An embodiment of the present disclosure provides a random access control apparatus, including a first receiving unit, configured to receive a first system broadcast message, where the first system broadcast message comprises a first indication information, and the first indication information is used for indicating whether a target cell of a terminal supports a 2-step RACH; a second receiving unit, configured to receive a second system broadcast message, where the second system broadcast message comprises access control information corresponding to the 2-step RACH; and a determining unit, configured to determine whether the 2-step RACH is allowed to be performed based on the first indication information and the access control information.

An embodiment of the present disclosure provides a network device including a processor and a memory. The memory is configured to store a computer program, and the processor is configured to call and run the computer program stored in the memory, to execute the random access control method described above.

An embodiment of the present disclosure provides a terminal including a processor and a memory. The memory is configured to store a computer program, and the processor is configured to call and run the computer program stored in the memory, to execute the random access control method described above.

An embodiment of the present disclosure provides a chip for executing the random access control method described above.

Specifically, the chip includes a processor. The processor is configured to call and run the computer program stored in the memory, to cause a device installed with the chip to execute the random access control method described above.

An embodiment of the present disclosure provides a computer-readable storage medium for storing a computer program, and the computer program causes a computer to execute the random access control method described above.

An embodiment of the present disclosure provides a computer program product including computer program instructions, and the computer program instructions cause a computer to execute the random access control method described above.

An embodiment of the present disclosure provides a computer program that causes a computer to execute the random access control method described above.

BRIEF DESCRIPTION OF THE DRAWINGS

The accompanying drawings described herein are used to provide a further understanding of the present disclosure and constitute a part of the specification. The exemplary embodiments and descriptions thereof are used to illustrate the present disclosure, and do not constitute any improper limitation of the present disclosure. In the drawings.

DETAILED DESCRIPTION

The technical solutions of the embodiments of the present disclosure will be described below with reference to the accompanying drawings in the embodiments of the present disclosure. Apparently, only a part of the embodiments, not all the embodiments of the present disclosure, are described. All other embodiments obtained, based on the embodiments described in the present disclosure, by those skilled in the art without paying creative efforts shall fall within the protection scope of the present disclosure.

The technical solutions of the embodiments of the present disclosure can be applied to various communication systems, such as a global system for mobile communications (GSM), a code division multiple access (CDMA) system, and a wideband code division multiple access (WCDMA) system, a general packet radio service (GPRS) system, a long term evolution (LTE) system, a LTE frequency division duplex (FDD) system, a LTE time division duplex (TDD) system, a universal mobile telecommunication system (UMTS), a worldwide interoperability for microwave access (WiMAX) communication system or the 5th generation (5G) system and so on.

Figure 1:
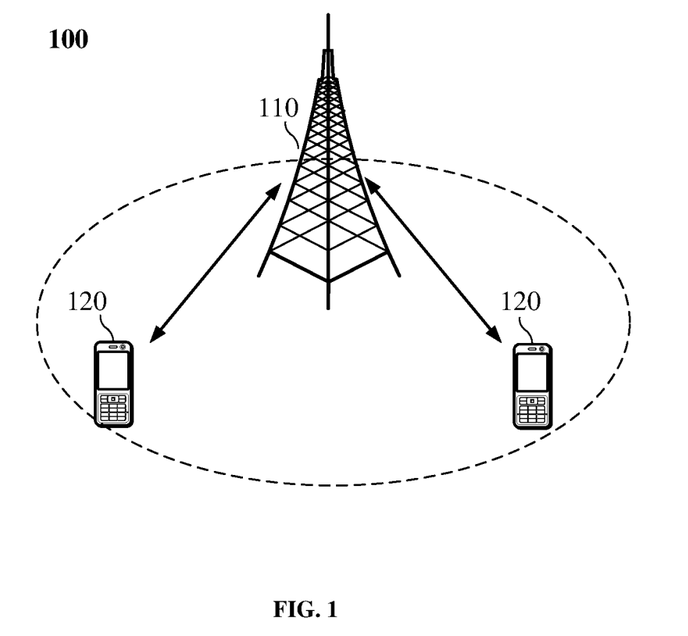
FIG. 1 is a schematic diagram illustrating a communication system architecture provided by an embodiment of the present disclosure.

For example, a communication system 100 where embodiments of the present disclosure are applied is shown in FIG. 1. The communication system 100 may include a network device 110, which may be a device that communicates with a terminal 120 (or referred to as a communication terminal or terminal). The network device 110 may provide communication coverage for a certain geographic area and may communicate with terminals in the area. Optionally, the network device 110 may be a base transceiver station (BTS) in a GSM system or a CDMA system, or a Node B (NB) in a WCDMA system or an evolutional Node B (eNB or eNodeB) in an LTE system, or a radio controller in a cloud radio access network (CRAN). Optionally, the network device may be a network side device in a mobile switching center, a relay station, an access point, a vehicle-mounted device, a wearable device, a hub, a switch, a network bridge, a router or the 5G network, or a network device in the future evolution of the public land mobile network (PLMN), etc.

The communication system 100 further includes at least one terminal 120 located within the coverage area of the network device 110. The "Terminal" as used herein includes, but is not limited to, a connection via a wired line, such as a connection via Public Switched Telephone Networks (PSTN), a Digital Subscriber Line (DSL), a digital cable, and a direct cable; and/or another data connection/network; and/or via a wireless interface, such as cellular network, Wireless Local Area Network (WLAN), digital television network such as DVB-H network, satellite network and an AM-FM broadcast transmitter; and/or a device of another terminal set to receive/send communication signals; and/or an Internet of things (IOT) device. The terminal set to communicate through the wireless interface may be referred to as "a wireless communication terminal," "a wireless terminal," or "a mobile terminal." Examples of the mobile terminal includes, but is not limited to, a satellite or cellular phone; a Personal Communications System (PCS) terminal that may combine a cellular radiophone with data processing, fax, and data communication capabilities; a PDA that may include a radiophone, a pager, an Internet/Intranet access, a web browser, a note, a calendar, and/or a Global Positioning System (GPS) receiver; and a conventional laptop and/or palmtop receiver or other electronic devices including a radiophone transceiver. The terminal may refer to an access terminal, User Equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be the cellular phone, a cordless telephone, a Session Initiation Protocol (SIP) phone, a Wireless Local Loop (WLL) station, the Personal Digital Assistant (PDA), a handheld device, a computing device having wireless connection functions or other processing device connected to a wireless modem, a vehicle-mounted device, a wearable device, a terminal in the 5G network or a terminal in the future evolving PLMN, etc.

Optionally, Device to Device (D2D) communication may be performed between the terminals 120.

Optionally, the 5G system or 5G network may also be referred to as a New Radio (NR) system or NR network.

FIG. 1 illustrates schematically one network device and two terminals. Optionally, the communication system 100 may include a plurality of network devices, and other number of terminals may be included within the coverage of each network device, which is not limited in the embodiments of the present disclosure.

Optionally, the communication system 100 may further include other network entities such as a network controller and a mobility management entity, which is not limited in the embodiment of the present disclosure.

It should be understood that a device with communication functions in the network/system in the embodiments of the present disclosure may be referred to as a communication device. Taking the communication system 100 shown in FIG. 1 as an example, the communication device may include the network device 110 and the terminal 120 with communication functions, and the network device 110 and the terminal 120 may be specific devices described above, which will not be repeated here; and the communication device may also include other devices in the communication system 100, such as the network controller, the mobile management entity and other network entities, which are not limited in the embodiments of the present disclosure.

It should be understood that the terms "system" and "network" herein are generally interchangeable herein. The term "and/or" herein is only used to describe an association relationship between associated objects, which represents that there may be three kinds of relationships. For example, A and/or B may represent three situations: A exists alone, A and B exist at the same time, and B exists alone. In addition, the character "/" herein generally represents an "or" relationship between pre and post associated objects.

In order to seek for speed, delay, high-speed mobility, and energy efficiency of services, as well as the diversity and complexity of services in future life, the 3rd Generation Partnership Project (3GPP) International Standards Organization starts to develop 5th Generation (5G) mobile communication technology.

The air interface part of the 5G mobile communication technology is called as New Radio (NR). In the early deployment of NR, it is difficult to achieve complete NR coverage. Therefore, the typical network coverage is the combination of Long Term Evolution (LTE) coverage and NR coverage. In addition, in order to save early investment on the LTE of the mobile operators, a tight interworking mode between LTE and NR is proposed. Of course, NR cells can also be deployed independently. In addition, since each NR cell is operated through beams, a cell has multiple beams.

The technical solutions of the embodiments of the present disclosure are mainly applied to a 5G mobile communication system. However, the technical solutions of the embodiments of the present disclosure are not limited to the 5G mobile communication system and can also be applied to other types of mobile communication systems. The main application scenarios in the 5G mobile communication system will be described below.

1) eMBB scenario: the eMBB aims at obtaining multimedia content, service, and data for the user, and its service demand is growing very rapidly. Since the eMBB may be deployed in different scenarios, such as interior, an urban area, and a rural area, etc., its service capability and demand are quite different, and therefore it is necessary to analyze the service in combination with specific deployment scenarios.

2) URLLC scenario: typical applications of the URLLC include industrial automation, power automation, telemedicine operation, and traffic safety guarantee, etc.

3) mMTC scenario: typical features of the URLLC include high connection density, small data volume, low cost and long service life of a delay insensitive service and module, etc.

Figure 2:
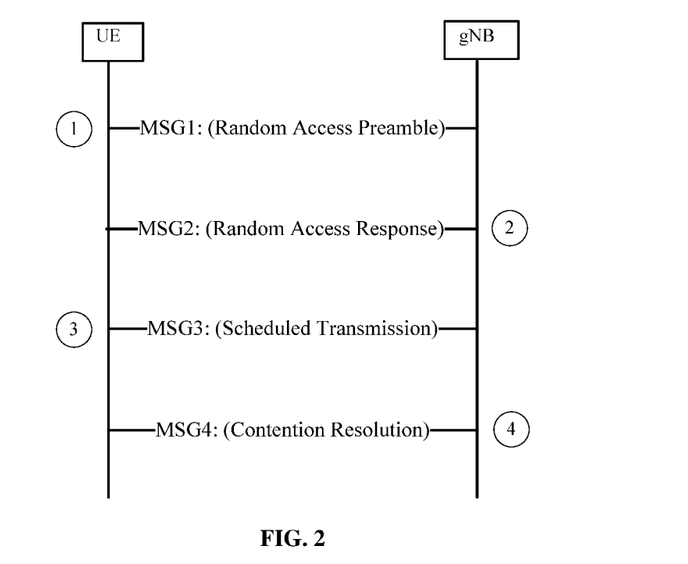
FIG. 2 is a flowchart of a 4-step RACH.

The UE needs to perform a random access process first to access the network side and obtain the RRC connection. Referring to FIG. 2, which is a flowchart illustrating a 4-step RACH, the 4-step RACH includes steps described below.

1. The UE sends MSG1, that is, Random Access Preamble, to the gNB.

Specifically, the UE selects a Physical Random Access Channel (PRACH) resource, and sends selected preambles on the PRACH resource. Herein, there are 64 preambles in total, and each preamble corresponds to an index value ranging from 0 to 63.

2. The gNB sends MSG2, that is, Random Access Response (RAR), to the UE.

Figure 3A:
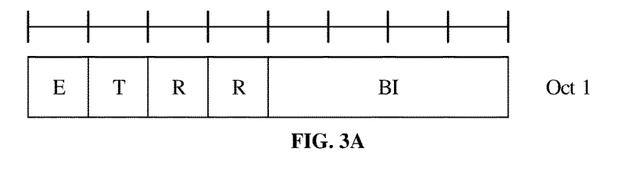
FIG. 3A illustrates a format of E/T/R/R/BI MAC subheader.
Figure 3B:
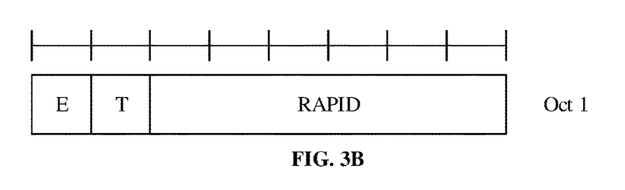
FIG. 3B illustrates a format of E/T/RAPID MAC subheader.
Figure 3C:
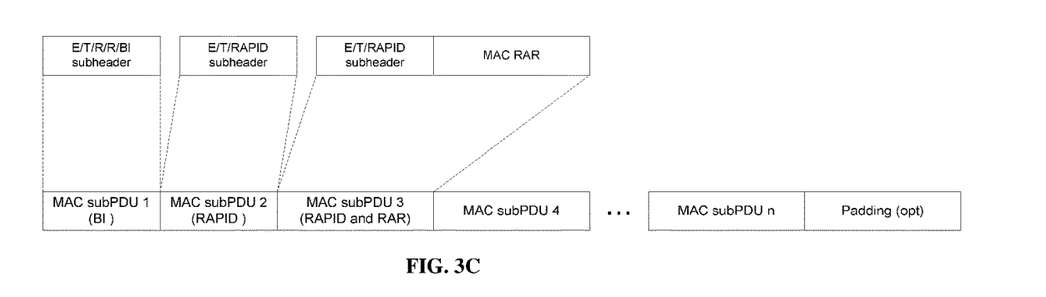
FIG. 3C illustrates a format of MAC PDU (including MAC RARs)
Figure 3D:
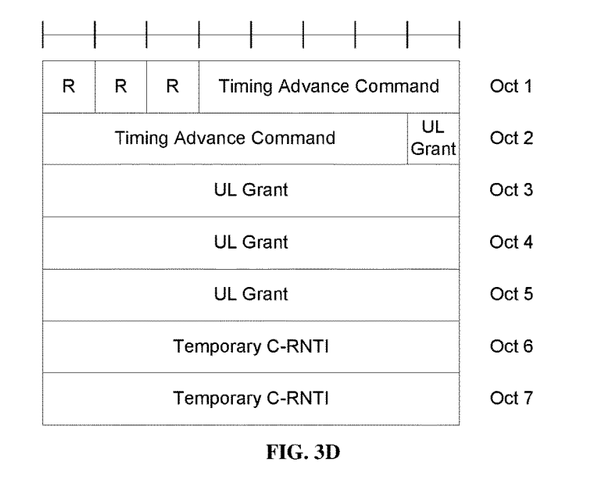
FIG. 3D is a schematic diagram of MAC RAR.

Specifically, in reply to the MSG1, the gNB sends a random access response to the UE, and the UE calculates a Random Access-Radio Network Temporary Identifier (RA-RNTI) used to scramble scheduling information of MSG2 according to the PRACH resource used for sending the Preamble. The media access control (MAC) layer data format of the RAR is shown in FIG. 3A, FIG. 3B, FIG. 3C and FIG. 3D. In particular, FIG. 3A illustrates the format of E/T/R/R/BI MAC subheader, FIG. 3B illustrates the format of E/T/RAPID MAC subheader, FIG. 3C illustrates the format of MAC PDU (including MAC RARs), and FIG. 3D is a schematic diagram of the MAC RAR.

3. The UE sends MSG3, that is, scheduled transmission, to the gNB.

Specifically, the network side may allocate, in MSG2, uplink resources for sending MSG3 to the UE, and the UE sends MSG3 on the uplink resources (UL grant) allocated by the network side.

4. The gNB sends MSG4, that is, contention resolution, to the UE.

In order to shorten the time delay of the random access process and quickly enter the network side to start services, a 2-step RACH is proposed. In the 2-step RACH, MSG1 and MSG3 are sent at the same time or almost at the same time (MSG3 can be sent without waiting for MSG2 herein), and MSG2 and MSG4 are sent together (through one physical downlink shared channel (PDSCH) or two PDSCHs).

In the 2-step RACH, the resources used for sending MSG3 are pre-configured, and the pre-configured resources are limited. In order to avoid waste of resources, the 2-step RACH does not configure many resources, and are not open to all terminals and/or all services. Therefore, it is necessary to reasonably control the terminals to adopt the 2-step RACH.

Figure 4:
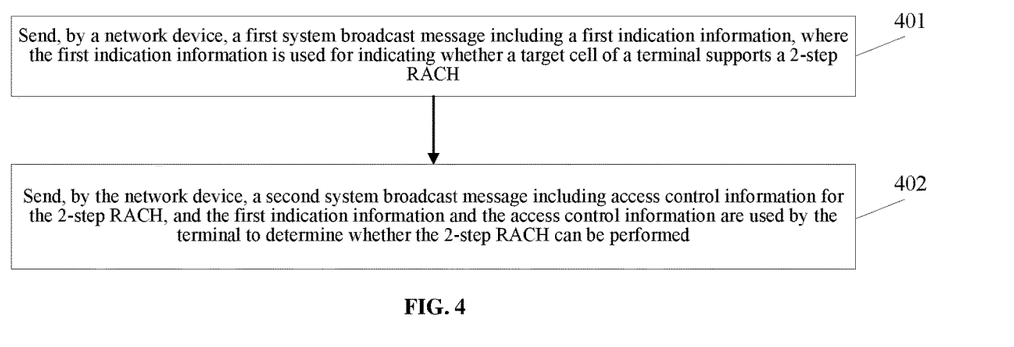
FIG. 4 is a first schematic flowchart of a random access control method provided by some embodiments of the present disclosure.

FIG. 4 is a first schematic flowchart of a random access control method provided by some embodiments of the present disclosure. As shown in FIG. 4, the random access control method includes steps described below.

In step 401, a network device sends a first system broadcast message including a first indication information. The first indication information is used for indicating whether a target cell of a terminal supports a 2-step RACH.

In the embodiment of the present disclosure, the network device may be a base station, such as the gNB in 5G or the eNB in 4G.

In embodiments of the present disclosure, the network device sends the first system broadcast message by broadcasting, the first system broadcast message includes the first indication information, and the first indication information is used for indicating whether the target cell of the terminal supports the 2-step RACH. Herein, the target cell refers to the current serving cell of the terminal.

Furthermore, the first indication information can be implemented in two manners described below.

Manner 1: Explicit Indicating Manner

The first system broadcast message includes a first information field carrying the first indication information.

Specifically, the network side broadcasts the first indication information, which is used for indicating whether the current serving cell of the UE supports the 2-step RACH. The first indication information may be represented by 1 bit, thereby indicating whether the current serving cell of the UE supports the 2-step RACH. For example, if the value of the bit is 1, it means that the current serving cell of the UE supports the 2-step RACH. If the value of the bit is 0, it means that the current serving cell of the UE does not support the 2-step RACH.

Manner 2: Implicit Indicating Manner

The first system broadcast message includes a first resource configuration information for the 2-step RACH, and the first resource configuration information is used for determining the first indication information.

Specifically, the first resource configuration information is used to configure multiple resources for the 2-step RACH. The resources are associated with cells. If the resource selected by the terminal supports the 2-step RACH, the cell corresponding to the resource also supports the 2-step RACH. If the resource selected by the terminal does not support the 2-step RACH, the cell corresponding to the resource also does not support the 2-step RACH.

In step 402, the network device sends a second system broadcast message including access control information for the 2-step RACH. The first indication information and the access control information are used by the terminal to determine whether the 2-step RACH can be performed.

In the embodiments of the present disclosure, the access control information includes a first information and/or a second information, and the first information is used for indicating whether a terminal corresponding to at least one access control (AC, Access Control) value can perform the 2-step RACH, and the second information is used for indicating whether the terminal corresponding to at least one access information can perform the 2-step RACH. The terminal uses the first information to determine whether the terminal can perform the 2-step RACH based on the AC value of the terminal, and the terminal uses the second information to determine whether the terminal can perform the 2-step RACH based on the access information of the terminal. Different implementations of the access control information are described below.

Manner 1

The access control information includes the first information, which is used for indicating whether the terminal corresponding to at least one AC value can perform the 2-step RACH. The terminal uses the first information to determine whether the terminal can perform the 2-step RACH based on the AC value of the terminal.

For example, the first information indicates that a terminal corresponding to the AC value of 11, 13, 15 can perform the 2-step RACH. If the AC value for a terminal is any one of 11, 13, 15, the terminal can perform the 2-step RACH.

In an embodiment, the first information includes a first bitmap, and each bit in the first bitmap corresponds to an AC value. The value of the bit is used for indicating whether the terminal with the AC value corresponding to the bit can perform the 2-step RACH.

For example, the first bitmap is an AC bitmap, and each bit in the AC bitmap represents a control for the UE corresponding to an AC value to use the 2-step RACH. For example, 10101 represents control information regarding whether UEs corresponding to AC ranging from 11 to 15 use the 2-step RACH. In this case, terminals corresponding to the AC value of 11, 13, and 15 can adopt the 2-step RACH upon accessing.

The terminal determines whether the current serving cell thereof supports the 2-step RACH based on the first indication information in the first system broadcast message. If the current serving cell supports the 2-step RACH, the terminal determines, according to its own AC value and the first information in the access control information, whether it can initiate a random access through the 2-step RACH.

Manner 2

The access control information includes the second information, which is used for indicating whether a terminal corresponding to at least one access information can perform the 2-step RACH. The terminal uses the second information to determine whether the terminal can perform the 2-step RACH based on the access information of the terminal.

In an embodiment, the second information includes a second bitmap, and each bit in the second bitmap corresponds to a piece of access information. The value of the bit is used for indicating whether the terminal with the access information corresponding to the bit can perform the 2-step RACH.

In the embodiments of the present disclosure, the access information includes at least one of the following: cause value of the access, a type of a service to be accessed, indication information of the cause value of the access, indication information of the type of the service to be accessed, and indication information of the cause value of the access and the type of the service to be accessed. Further, the cause value of the access is the cause value of establishing an RRC connection, or the cause value of restoring the RRC connection, or the cause value of reestablishing the RRC connection. Further, the access information is obtained through a non-access stratum (NAS) or an access stratum (AS) of the terminal.

In the above solution, the cause value of the current access of the terminal can be defined as "Emergency," "High Priority Access," "MT Access," "MO Signalling," "MO Data," "MO Voice Call," "MO Video Call," "MO SMS," "MPS-PriorityAccess" or "MC-PriorityAccess."

In the above solution, the type of the service currently accessed by the terminal can be enhanced mobile broadband (eMBB) service, ultra reliable low latency communication (URLLC) service, voice service, or video services, etc.

For example, a bitmap with cause values (that is, the second bitmap) is defined, and each bit in the bitmap represents whether the 2-step RACH can be used for a cause value.

As another example, a bitmap with service types (that is, the second bitmap) is defined, and each bit in the bitmap represents whether the 2-step RACH can be used for a service type.

As yet another example, a bitmap with access category (that is, the second bitmap) is defined, and each bit in the bitmap represents whether the 2-step RACH can be used for a group of cause values and service types.

It should be noted that, for triggering the RRC layer to initiate RRC connection establishment or RRC connection restoration or RRC connection reestablishment, the NAS layer of the UE will transfer the following:

cause value or service type for RRC connection establishment/RRC connection restoration/RRC connection reestablishment; or indication information for indicating the cause value of RRC connection establishment/RRC connection restoration/RRC connection reestablishment, or indication information for indicating service type for RRC connection establishment/RRC connection restoration/RRC connection reestablishment.

The terminal determines whether the current serving cell thereof supports the 2-step RACH based on the first indication information in the first system broadcast message. If the current serving cell supports the 2-step RACH, the terminal determines, according to the information transferred from the NAS layer and the second information in the access control information, whether to initiate a random access through the 2-step RACH.

Manner 3

The access control information includes a first information and a second information, and the first information is used for indicating whether a terminal corresponding to at least one AC value can perform the 2-step RACH, and the second information is used for indicating whether the terminal corresponding to at least one access information can perform the 2-step RACH. The terminal uses the first information to determine whether the terminal can perform a 2-step RACH based on the AC of the terminal, and the terminal uses the second information to determine whether the terminal can perform a 2-step RACH based on the access information of the terminal.

Herein, the specific implementation manner of the first information can be understood with reference to the description of the foregoing implementation manner 1, and the specific implementation manner of the second information can be understood with reference to the description of the foregoing implementation manner 2 and will not be repeated herein.

The terminal determines whether the current serving cell thereof supports the 2-step RACH based on the first indication information in the first system broadcast message. If the current serving cell supports the 2-step RACH, the terminal determines, according to the AC value thereof in combination with the first information in the access control information as well as the information transferred from the NAS layer in combination with the second information in the access control information, whether to initiate a random access through the 2-step RACH.

Figure 5:
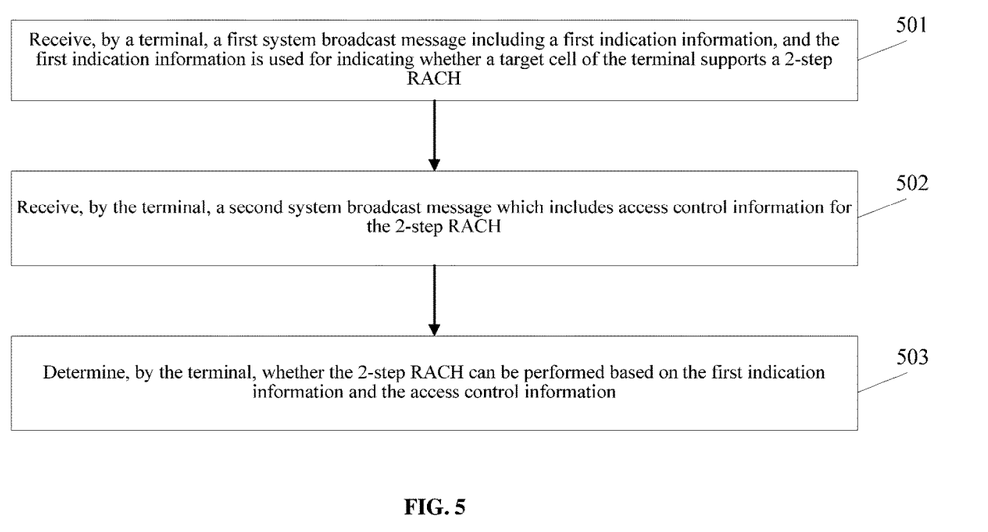
FIG. 5 is a second schematic flowchart of a random access control method provided by some embodiments of the present disclosure.

FIG. 5 is a second schematic flowchart of a random access control method provided by some embodiments of the present disclosure. As shown in FIG. 5, the random access control method includes steps described below.

In step 501, a terminal receives a first system broadcast message including a first indication information. The first indication information is used for indicating whether a target cell of the terminal supports a 2-step RACH.

In the embodiments of the present disclosure, the terminal may be a mobile phone, a tablet computer, a vehicle-mounted terminal, a notebook and any other device capable of communicating with the network.

In embodiments of the present disclosure, the terminal receives the first system broadcast message sent from a network device. Herein, the network device may be a base station such as the gNB in 5G or the eNB in 4G. The first system broadcast message includes the first indication information, and the first indication information is used for indicating whether the target cell of the terminal supports the 2-step RACH. Herein, the target cell refers to the current serving cell of the terminal.

Furthermore, the first indication information can be implemented in two manners described below.

Manner 1: Explicit Indicating Manner

The first system broadcast message includes a first information field carrying the first indication information.

Specifically, the network side broadcasts the first indication information, which is used for indicating whether the current serving cell of the UE supports the 2-step RACH. The first indication information may be represented by 1 bit, thereby indicating whether the current serving cell of the UE supports the 2-step RACH. For example, if the value of the bit is 1, it means that the current serving cell of the UE supports the 2-step RACH. If the value of the bit is 0, it means that the current serving cell of the UE does not support the 2-step RACH.

Manner 2: Implicit Indicating Manner

The first system broadcast message includes a first resource configuration information for the 2-step RACH, and the first resource configuration information is used for determining the first indication information.

Specifically, the first resource configuration information is used to configure multiple resources for the 2-step RACH. The resources are associated with cells. If the resource selected by the terminal supports the 2-step RACH, the cell corresponding to the resource also supports the 2-step RACH. If the resource selected by the terminal does not support the 2-step RACH, the cell corresponding to the resource also does not support the 2-step RACH.

In step 502, the terminal receives a second system broadcast message which includes access control information for the 2-step RACH.

In the embodiments of the present disclosure, the access control information includes a first information and/or a second information, and the first information is used for indicating whether a terminal corresponding to at least one access control (AC) value can perform the 2-step RACH, and the second information is used for indicating whether the terminal corresponding to at least one access information can perform the 2-step RACH. The terminal uses the first information to determine whether the terminal can perform a 2-step RACH based on the AC of the terminal, and the terminal uses the second information to determine whether the terminal can perform a 2-step RACH based on the access information of the terminal. Different implementations of the access control information are described below.

Manner 1

The access control information includes the first information, which is used for indicating whether the terminal corresponding to at least one AC value can perform the 2-step RACH. The terminal uses the first information to determine whether it can perform the 2-step RACH based on the AC value thereof.

For example, the first information indicates that a terminal corresponding to the AC value of 11, 13, 15 can perform the 2-step RACH. If the AC value for a terminal is any one of 11, 13, 15, the terminal can perform the 2-step RACH.

In an embodiment, the first information includes a first bitmap, and each bit in the first bitmap corresponds to an AC value. The value of the bit is used for indicating whether the terminal with the AC value corresponding to the bit can perform the 2-step RACH.

For example, the first bitmap is an AC bitmap, and each bit in the AC bitmap represents a control for the UE corresponding to an AC value to use the 2-step RACH. For example, 10101 represents control information regarding whether UEs corresponding to AC ranging from 11 to 15 use the 2-step RACH. In this case, terminals corresponding to the AC value of 11, 13, and 15 can adopt the 2-step RACH upon accessing.

The terminal determines whether the current serving cell thereof supports the 2-step RACH based on the first indication information in the first system broadcast message. If the current serving cell supports the 2-step RACH, the terminal determines, according to its own AC value and the first information in the access control information, whether it can initiate a random access through the 2-step RACH.

Manner 2

The access control information includes the second information, which is used for indicating whether a terminal corresponding to at least one access information can perform the 2-step RACH. The terminal uses the second information to determine whether the terminal can perform the 2-step RACH based on the access information of the terminal.

In an embodiment, the second information includes a second bitmap, and each bit in the second bitmap corresponds to a piece of access information. The value of the bit is used for indicating whether the terminal with the access information corresponding to the bit can perform the 2-step RACH.

In the embodiments of the present disclosure, the access information includes at least one of the following: cause value of the access, a type of a service to be accessed, indication information of the cause value of the access, indication information of the type of the service to be accessed, and indication information of the cause value of the access and the type of the service to be accessed. Further, the cause value of the access is the cause value of establishing an RRC connection, or the cause value of restoring the RRC connection, or the cause value of reestablishing the RRC connection. Further, the access information is obtained through a non-access stratum (NAS) or an access stratum (AS) of the terminal.

In the above solution, the cause value of the current access of the terminal can be defined as "Emergency," "High Priority Access," "MT Access," "MO Signalling," "MO Data," "MO Voice Call," "MO Video Call," "MO SMS," "MPS-PriorityAccess" or "MC-PriorityAccess."

In the above solution, the type of the service currently accessed by the terminal can be enhanced mobile broadband (eMBB) service, ultra reliable low latency communication (URLLC) service, voice service, or video services, etc.

For example, a bitmap with cause values (that is, the second bitmap) is defined, and each bit in the bitmap represents whether the 2-step RACH can be used for a cause value.

As another example, a bitmap with service types (that is, the second bitmap) is defined, and each bit in the bitmap represents whether the 2-step RACH can be used for a service type.

As yet another example, a bitmap with access types (that is, the second bitmap) is defined, and each bit in the bitmap represents whether the 2-step RACH can be used for a group of cause values and service types.

It should be noted that, for triggering the RRC layer to initiate RRC connection establishment or RRC connection restoration or RRC connection reestablishment, the NAS layer of the UE will transfer the following:

cause value or service type for RRC connection establishment/RRC connection restoration/RRC connection reestablishment; or indication information for indicating the cause value of RRC connection establishment/RRC connection restoration/RRC connection reestablishment, or indication information for indicating service type for RRC connection establishment/RRC connection restoration/RRC connection reestablishment.

The terminal determines whether the current serving cell thereof supports the 2-step RACH based on the first indication information in the first system broadcast message. If the current serving cell supports the 2-step RACH, the terminal determines, according to the information transferred from the NAS layer and the second information in the access control information, whether to initiate a random access through the 2-step RACH.

Manner 3

The access control information includes a first information and a second information, and the first information is used for indicating whether a terminal corresponding to at least one AC value can perform the 2-step RACH, and the second information is used for indicating whether the terminal corresponding to at least one access information can perform the 2-step RACH. The terminal uses the first information to determine whether the terminal can perform a 2-step RACH based on the AC of the terminal, and the terminal uses the second information to determine whether the terminal can perform a 2-step RACH based on the access information of the terminal.

Herein, the specific implementation manner of the first information can be understood with reference to the description of the foregoing implementation manner 1, and the specific implementation manner of the second information can be understood with reference to the description of the foregoing implementation manner 2 and will not be repeated herein.

The terminal determines whether the current serving cell thereof supports the 2-step RACH based on the first indication information in the first system broadcast message. If the current serving cell supports the 2-step RACH, the terminal determines, according to the AC value thereof in combination with the first information in the access control information as well as the information transferred from the NAS layer in combination with the second information in the access control information, whether to initiate a random access through the 2-step RACH.

In step 503, the terminal determines whether a 2-step RACH can be performed based on the first indication information and the access control information.

Figure 6:
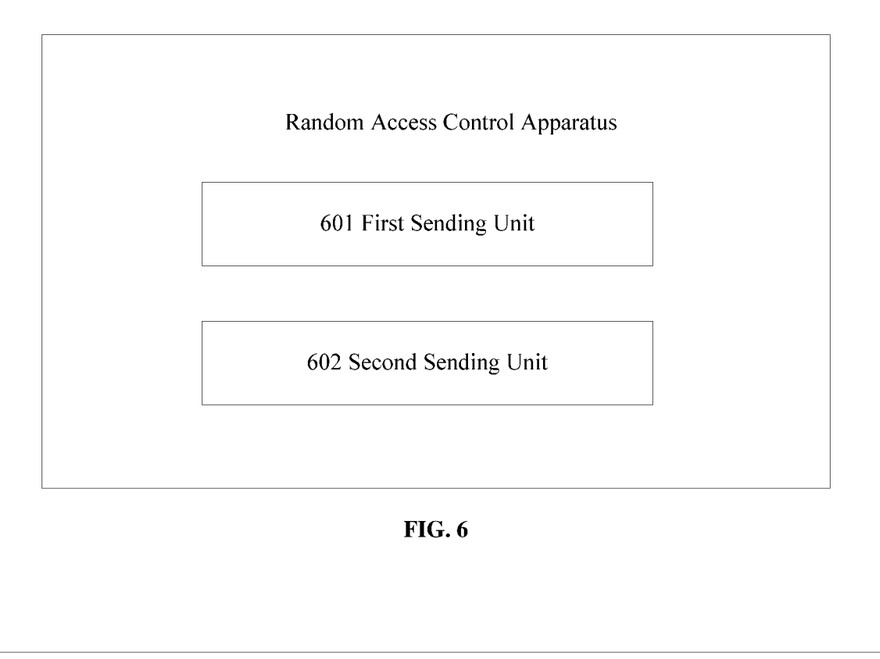
FIG. 6 is a first schematic diagram illustrating a structure of a random access control apparatus provided by some embodiments of the present disclosure.

FIG. 6 is a first schematic diagram illustrating the structure of a random access control apparatus provided by some embodiments of the present disclosure. The random access control apparatus is applied to a network device, such as a base station. As shown in FIG. 6, the device includes a first sending unit 601 and a second sending unit 602.

The first sending unit 601 is configured to send a first system broadcast message which includes a first indication information. The first indication information is used for indicating whether a target cell of a terminal supports a 2-step RACH.

The second sending unit 602 is configured to send a second system broadcast message which includes access control information for the 2-step RACH.

The first indication information and the access control information are used by the terminal to determine whether the 2-step RACH can be performed.

In an embodiment, the first system broadcast message includes the first indication information by carrying the first indication information in a first information field of the first system broadcast message.

In an embodiment, the first system broadcast message includes the first indication information, and the first system broadcast message includes a first resource configuration information for the 2-step RACH, and the first resource configuration information is used for determining the first indication information.

In an embodiment, the access control information includes the first information and/or the second information. The first information is used for indicating whether a terminal corresponding to at least one AC value can perform the 2-step RACH, and the second information is used for indicating whether the terminal corresponding to at least one access information can perform the 2-step RACH.

The terminal uses the first information to determine whether it can perform a 2-step RACH based on the AC value of the terminal and uses the second information to determine whether it can perform the 2-step RACH based on the access information of the terminal.

In an embodiment, the first information includes a first bitmap, and each bit in the first bitmap corresponds to an AC value. The value of the bit is used for indicating whether a terminal with the AC value corresponding to the bit can perform the 2-step RACH.

In an embodiment, the second information includes a second bitmap, and each bit in the second bitmap corresponds to a piece of access information. The value of the bit is used for indicating whether a terminal with the access information corresponding to the bit can perform the 2-step RACH.

In an embodiment of the present disclosure, the access information includes at least one of the following: cause value of the access, a type of a service to be accessed, indication information of the cause value of the access, indication information of the type of the service to be accessed, and indication information of the cause value of the access and the type of the service to be accessed.

In an embodiment, the cause value of the access is the cause value of establishing the RRC connection, or the cause value of restoring the RRC connection, or the cause value of reestablishing the RRC connection.

In an embodiment, the access information is obtained through the NAS layer or the AS layer of the terminal.

Those skilled in the art should understand that the relevant description of the foregoing random access control apparatus provided in the embodiments of the present disclosure can be understood with reference to the relevant description of the random access control method provided in the embodiments of the present disclosure.

Figure 7:
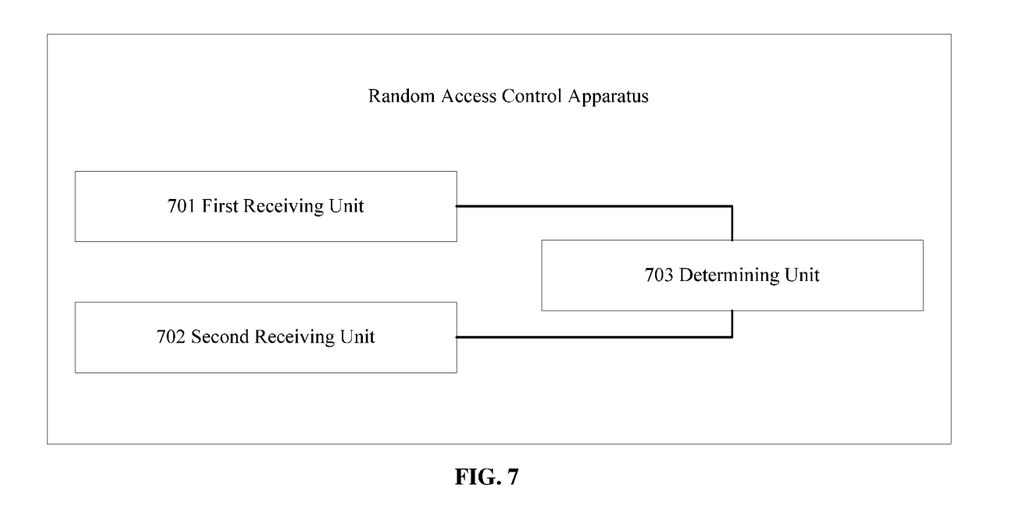
FIG. 7 is a second schematic diagram illustrating a structure of a random access control apparatus provided by some embodiments of the present disclosure.

FIG. 7 is a second schematic diagram illustrating the structure of a random access control apparatus provided by some embodiments of the present disclosure, which is applied to a terminal. As shown in FIG. 7, the device includes a first receiving unit 701, a second receiving unit 702 and a determining unit 703.

The first receiving unit 701 is configured to receive a first system broadcast message which includes a first indication information. The first indication information is used for indicating whether a target cell of a terminal supports a 2-step RACH.

The second receiving unit 702 is configured to receive a second system broadcast message which includes access control information for the 2-step RACH.

The determining unit 703 is configured to determine whether the 2-step RACH can be performed based on the first indication information and the access control information.

In an embodiment, the first system broadcast message includes the first indication information by carrying the first indication information in a first information field of the first system broadcast message.

In an embodiment, the first system broadcast message includes the first indication information, and the first system broadcast message includes a first resource configuration information for the 2-step RACH, and the first resource configuration information is used for determining the first indication information.

In an embodiment, the access control information includes the first information and/or the second information. The first information is used for indicating whether a terminal corresponding to at least one AC value can perform the 2-step RACH, and the second information is used for indicating whether the terminal corresponding to at least one access information can perform the 2-step RACH.

The terminal uses the first information to determine whether it can perform a 2-step RACH based on the AC value of the terminal and uses the second information to determine whether it can perform the 2-step RACH based on the access information of the terminal.

In an embodiment, the first information includes a first bitmap, and each bit in the first bitmap corresponds to an AC value. The value of the bit is used for indicating whether a terminal with the AC value corresponding to the bit can perform the 2-step RACH.

In an embodiment, the second information includes a second bitmap, and each bit in the second bitmap corresponds to a piece of access information. The value of the bit is used for indicating whether a terminal with the access information corresponding to the bit can perform the 2-step RACH.

In an embodiment of the present disclosure, the access information includes at least one of the following: cause value of the access, a type of the service to be accessed, indication information of the cause value of the access, indication information of the type of the service to be accessed, and indication information of the cause value of the access and the type of the service to be accessed.

In an embodiment, the cause value of the access is the cause value of establishing the RRC connection, or the cause value of restoring the RRC connection, or the cause value of reestablishing the RRC connection.

In an embodiment, the access information is obtained through the NAS layer or the AS layer of the terminal.

Those skilled in the art should understand that the relevant description of the foregoing random access control apparatus provided in the embodiments of the present disclosure can be understood with reference to the relevant description of the random access control method provided in the embodiments of the present disclosure.

Figure 8:
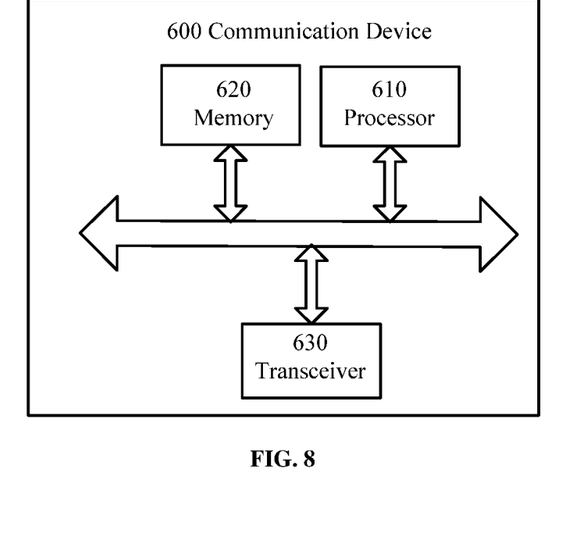
FIG. 8 is a schematic structural diagram of a communication device provided by some embodiments of the present disclosure.

FIG. 8 is a schematic structural diagram of a communication device 600 provided by some embodiments of the present disclosure. The communication device may be a network device or a terminal. The communication device 600 shown in FIG. 8 includes a processor 610. The processor 610 may call a computer program from a memory and run the computer program to implement the method provided in the embodiments of the present disclosure.

Optionally, as shown in FIG. 8, the communication device 600 may further include a memory 620. The processor 610 may call the computer program from the memory 620 and run the computer program to implement the method provided in the embodiments of the present disclosure.

The memory 620 may be a device separated from the processor 610 or may be integrated into the processor 610.

Optionally, as shown in FIG. 8, the communication device 600 may further include a transceiver 630, and the processor 610 may control the transceiver 630 to communicate with other devices. Specifically, the transceiver 630 may send information or data to other devices, or receive information or data sent by other devices.

The transceiver 630 may include a transmitter and a receiver. The transceiver 630 may further include antennas, and the number of antennas may be one or more.

Optionally, the communication device 600 may be the network device of the embodiments of the present disclosure and may implement the corresponding process implemented by the network device in each method of the embodiments of the present disclosure. For the sake of brevity, details are not repeated here.

Optionally, the communication device 600 may be the mobile terminal/terminal of the embodiments of the present disclosure and may implement the corresponding process implemented by the mobile terminal/terminal in each method of the embodiments of the present disclosure. For the sake of brevity, details are not repeated here.

Figure 9:
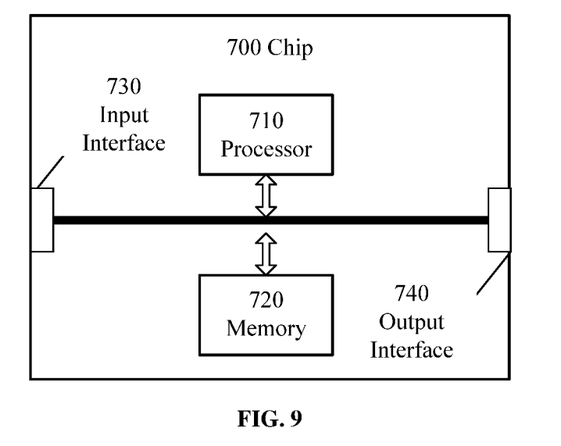
FIG. 9 is a schematic structural diagram of a chip provided by some embodiments of the present disclosure.

FIG. 9 is a schematic structural diagram of a chip of some embodiments of the present disclosure. The chip 700 shown in FIG. 9 includes a processor 710 which can call a computer program from the memory and run the computer program to implement the method in the embodiments of the present disclosure.

Optionally, as shown in FIG. 9, the chip 700 may further include a memory 720. The processor 710 may call the computer program from the memory 720 and run it to implement the method in the embodiments of the present disclosure.

The memory 720 may be a device separated from the processor 710 or may be integrated into the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 can control the output interface 740 to communicate with other devices or chips, and specifically, can output information or data to other devices or chips.

Optionally, the chip can be applied to the network device in the embodiments of the present disclosure, and the chip can implement the corresponding process implemented by the network device in each method of the embodiments of the present disclosure. For the sake of brevity, details are not described herein again.

Optionally, the chip may be applied to the mobile terminal/terminal of the embodiments of the present disclosure and may implement the corresponding process implemented by the mobile terminal/terminal in each method of the embodiments of the present disclosure. For the sake of brevity, details are not repeated here.

It should be understood that the chip described in embodiments of the present disclosure can also be referred to as a system on chip, a system chip or a chip system and so on.

Figure 10:
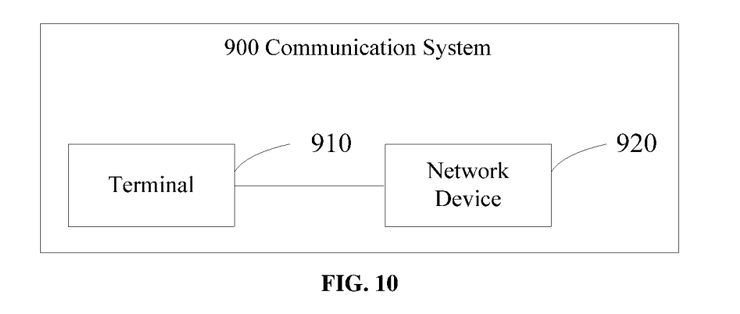
FIG. 10 is a schematic diagram illustrating a communication system provided by some embodiments of the present disclosure.

FIG. 10 is a schematic diagram illustrating a communication system provided by some embodiments of the present disclosure. As shown in FIG. 10, the communication system 900 includes a terminal 910 and a network device 920.

The terminal 910 may implement corresponding functions performed by the terminal in methods described above, and the network device 920 may implement corresponding functions performed by the network device in the methods described above. For the sake of brevity, details are not repeated here.

It should be understood that the processor of the embodiments of the present disclosure may be an integrated circuit chip with signal processing capability. In the implementation process, the steps of the foregoing method embodiments can be performed by hardware integrated logic circuits in the processor or instructions in the form of software. The above-mentioned processor can be a general-purpose processor, a digital signal processor (DSP), an application specific integrated circuit (ASIC), a field programmable gate array (FPGA) or other programmable logic devices, discrete gates or transistor logic devices, discrete hardware components. The methods, steps, and logical block diagrams disclosed in the embodiments of the present disclosure can be implemented or executed. The general-purpose processor may be a microprocessor or the processor may also be any conventional processor or the like. The steps of the method disclosed in the embodiments of the present disclosure can be directly executed by a hardware decoding processor, or executed by a combination of hardware and software modules in the decoding processor. The software module can be located in a mature storage medium in the field such as a random access memory, a flash memory, a read-only memory, a programmable read-only memory, or an electrically erasable programmable memory, registers. The storage medium is located in the memory, and the processor reads the information in the memory and completes the steps of the above method in combination with its hardware.

It should be understood that the memory in the embodiments of the present disclosure may be volatile memory or non-volatile memory, or may include both volatile and non-volatile memory. Among them, the non-volatile memory can be read-only memory (ROM), programmable read-only memory (PROM), erasable programmable read-only memory (EPROM), and Electrically Erase programmable read-only memory (EEPROM) or flash memory. The volatile memory may be a random access memory (RAM), which is used as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these memories and any other suitable types of memories.

It should be understood that the above memories are exemplary rather than lamination. For example, the memory in the embodiments of the present disclosure may be a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM) and so on. In other words, the memories of the systems and methods described herein are intended to include, but are not limited to, these memories and any other suitable types of memories.

The embodiments of the present disclosure further provide a computer-readable storage medium for storing computer programs.

Optionally, the computer-readable storage medium can be applied to the network device provided in the embodiments of the present disclosure, and the computer program causes the computer to execute the corresponding process implemented by the network device in each method of the embodiment of the present disclosure. For the sake of brevity, descriptions are not repeated here.

Optionally, the computer-readable storage medium can be applied to the mobile terminal/terminal in the embodiments of the present disclosure, and the computer program causes the computer to execute the corresponding process implemented by the mobile terminal/terminal in each method of the embodiments of the present disclosure. For the sake of brevity, descriptions are not repeated here.

The embodiments of the present disclosure further provide a computer program product including computer program instructions.

Optionally, the computer program product can be applied to the network device provided in the embodiments of the present disclosure, and the computer program instructions cause the computer to execute the corresponding process implemented by the network device in each method of the embodiments of the present disclosure. For the sake of brevity, descriptions are not repeated here.

Optionally, the computer program product can be applied to the mobile terminal/terminal in the embodiments of the present disclosure, and the computer program instructions cause the computer to execute the corresponding process implemented by the mobile terminal/terminal in each method of the embodiments of the present disclosure. For the sake of brevity, descriptions are not repeated here.

The embodiments of the present disclosure further provide a computer program.

Optionally, the computer program can be applied to the network device provided in the embodiments of the present disclosure. The computer program, when executed on the computer, causes the computer to execute the corresponding process implemented by the network device in each method of the embodiments of the present disclosure. For the sake of brevity, descriptions are not repeated here.

Optionally, the computer program can be applied to the mobile terminal/terminal in the embodiments of the present disclosure. The computer program, when executed on the computer, causes the computer to execute the corresponding process implemented by the mobile terminal/terminal in each method of the embodiments of the present disclosure. For the sake of brevity, descriptions are not repeated here.

Those ordinary skilled in the art may realize that the units and algorithm steps of the examples described in combination with the embodiments can be implemented by electronic hardware or a combination of computer software and electronic hardware. Whether these functions are executed by hardware or software depends on the specific application and design constraints of the technical solution. Professionals and technicians can use different methods for each specific application to implement the described functions, but such implementation should not be considered beyond the scope of the present disclosure.

Those skilled in the art can clearly understand that, for convenience and concise description, the specific working process of the above-described system, device, and units can refer to the corresponding process in the foregoing method embodiment, and details are not repeated herein.

In some embodiments provided in the present disclosure, it should be understood that the proposed system, device, and method may be implemented in other ways. For example, the device embodiments described above are merely illustrative. For example, the division of the units is only a logical function division, and there may be other divisions in actual implementation, for example, multiple units or components may be combined or integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separated components may or may not be physically separated, and the components displayed as units may or may not be physical units, that is, they may be located at one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or the units are separated physically, or two or more units may be integrated into one unit.

The function can be stored in a computer readable storage medium if it is implemented in the form of a software functional unit and sold or used as an independent product. In view of this, the essential part or the part that contributes to the related art of the technical solution of the present disclosure or a part of the technical solution of the present disclosure can be embodied in the form of a software product. The computer software product is stored in a storage medium and includes several instructions that cause a computer device (which may be a personal computer, a server, or a network device, etc.) to execute all or part of the steps of the methods described in the various embodiments of the present disclosure. The aforementioned storage media includes: an USB flash disk, a mobile hard disk drive, a read-only memory (ROM), a random access memory (RAM), a magnetic disk or optical disks and other media that can store program codes.

The above are only specific implementations of the present disclosure, but the scope of protection of the present disclosure is not limited to this. Any changes or substitutions easily conceived by those skilled in the art based on the contents of the present disclosure fall within the protection scope of the present disclosure. Therefore, the protection scope of the present disclosure shall be subject to the protection scope of the claims.

What is claimed is:

1. A method for random access control, comprising:
    sending, by a network device, a first system broadcast message, wherein the first system broadcast message comprises a first indication information, and the first indication information is used for indicating whether a target cell of a terminal supports a 2-step random access process; and
    sending, by the network device, a second system broadcast message, wherein the second system broadcast message comprises access control information corresponding to the 2-step random access process,
    wherein the first indication information and the access control information are used by the terminal to determine whether the terminal is allowed to perform the 2-step random access process,
    wherein the access control information comprises at least one of a first information and a second information, and the first information is used for indicating whether a terminal corresponding to at least one access control (AC) value is allowed to perform the 2-step random access process, and the second information is used for indicating whether a terminal corresponding to at least one access information is allowed to perform the 2-step random access process.

2. The method according to claim 1, wherein the first system broadcast message comprises the first indication information in the following manner:
    carrying the first indication information in a first information field comprised in the first system broadcast message; or
    comprising a first resource configuration information for the 2-step random access process in the first system broadcast message, wherein the first resource configuration information is used for determining the first indication information.

3. The method according to claim 1,
    wherein the first information is used by the terminal to determine whether the terminal is allowed to perform the 2-step random access process based on the AC value of the terminal, and the second information is used by the terminal to determine whether the terminal is allowed to perform the 2-step random access process based on the access information of the terminal.

4. The method according to claim 3, wherein the first information comprises a first bitmap, and each bit in the first bitmap corresponds to an AC value, wherein the value of the bit is used for indicating whether a terminal with the AC value corresponding to the bit is allowed to perform the 2-step random access process; or
    wherein the second information comprises a second bitmap, and each bit in the second bitmap corresponds to a piece of access information, wherein the value of the bit is used for indicating whether a terminal with the access information corresponding to the bit is allowed to perform the 2-step random access process.

5. The method according to claim 3, wherein the access information comprises at least one of the following: cause value of the access, a type of a service to be accessed, indication information of the cause value of the access, indication information of the type of the service to be accessed, and indication information of the cause value and the type of the service to be accessed.

6. The method according to claim 5, wherein the cause value of the access is the cause value of establishing a radio resource control (RRC) connection, or the cause value of restoring the RRC connection, or the cause value of reestablishing the RRC connection.

7. The method according to claim 3, wherein the access information is obtained through a non-access stratum (NAS) or an access stratum (AS) of the terminal.

8. A method for random access control, comprising:
receiving, by a terminal, a first system broadcast message, wherein the first system broadcast message comprises a first indication information, and the first indication information is used for indicating whether a target cell of the terminal supports a 2-step random access process; and
receiving, by the terminal, a second system broadcast message, wherein the second system broadcast message comprises access control information corresponding to the 2-step random access process,
wherein the first indication information and the access control information are used by the terminal to determine whether the terminal is allowed to perform the 2-step random access process
wherein the access control information comprises at least one of a first information and a second information, and the first information is used for indicating whether a terminal corresponding to at least one access control (AC) value is allowed to perform the 2-step random access process, and the second information is used for indicating whether a terminal corresponding to at least one access information is allowed to perform the 2-step random access process.

9. The method according to claim 8, wherein the first system broadcast message comprises the first indication information in the following manner:
carrying the first indication information in a first information field comprised in the first system broadcast message; or
comprising a first resource configuration information for the 2-step random access process in the first system broadcast message, and the first resource configuration information is used for determining the first indication information.

10. The method according to claim 8,
wherein the first information is used by the terminal to determine whether the terminal is allowed to perform the 2-step random access process based on the AC of the terminal, and the second information is used by the terminal to determine whether the terminal is allowed to perform the 2-step random access process based on the access information of the terminal.

11. The method according to claim 10, wherein the first information comprises a first bitmap, and each bit in the first bitmap corresponds to an AC value, wherein the value of the bit is used for indicating whether a terminal with the AC value corresponding to the bit is allowed to perform the 2-step random access process; or wherein the second information comprises a second bitmap, and each bit in the second bitmap corresponds to a piece of access information, wherein the value of the bit is used for indicating whether a terminal with the access information corresponding to the bit is allowed to perform the 2-step random access process.

12. The method according to claim 10, wherein the access information comprises at least one of the following: cause value of the access, a type of a service to be accessed, indication information of the cause value of the access, indication information of the type of the service to be accessed, and indication information of the cause value and the type of the service to be accessed.

13. The method according to claim 12, wherein the cause value of the access is the cause value of establishing a radio resource control (RRC) connection, or the cause value of restoring the RRC connection, or the cause value of reestablishing the RRC connection.

14. The method according to claim 10, wherein the access information is obtained through a non-access stratum (NAS) or an access stratum (AS) of the terminal.

15. A apparatus for random access control, comprising: a processor and a memory, wherein the memory is configured to store a computer program, and the processor is configured to call the computer program stored in the memory and run the computer program to:
receive a first system broadcast message, wherein the first system broadcast message comprises a first indication information, and the first indication information is used for indicating whether a target cell of a terminal supports a 2-step random access process;
receive a second system broadcast message, wherein the second system broadcast message comprises access control information corresponding to the 2-step random access process; and
determine whether the 2-step random access process is allowed to be performed based on the first indication information and the access control information
wherein the access control information comprises at least one of a first information and a second information, and the first information is used for indicating whether a terminal corresponding to at least one access control (AC) value is allowed to perform the 2-step random access process, and the second information is used for indicating whether a terminal corresponding to at least one access information is allowed to perform the 2-step random access process.

16. The apparatus according to claim 15, wherein the first system broadcast message comprises the first indication information in the following manner:
carrying the first indication information in a first information field comprised in the first system broadcast message; or
comprising a first resource configuration information for the 2-step random access process in the first system broadcast message, wherein the first resource configuration information is used for determining the first indication information.

17. The apparatus according to claim 15,
wherein the first information is used by the terminal to determine whether the terminal is allowed to perform the 2-step random access process based on the AC of the terminal, and the second information is used by the terminal to determine whether the terminal is allowed to perform the 2-step random access process based on the access information of the terminal.

18. The apparatus according to claim 17, wherein the access information comprises at least one of the following: cause value of the access, a type of a service to be accessed, indication information of the cause value of the access, indication information of the type of a service to be accessed, and indication information of the cause value and the type of the service to be accessed.

19. The apparatus according to claim 18, wherein the cause value of the access is the cause value of establishing a radio resource control (RRC) connection, or the cause value of restoring the RRC connection, or the cause value of reestablishing the RRC connection.

20. The apparatus according to claim 17, wherein the first information comprises a first bitmap, and each bit in the first bitmap corresponds to an AC value, wherein the value of the bit is used for indicating whether a terminal with the AC value corresponding to the bit is allowed to perform the 2-step random access process; or wherein the second information comprises a second bitmap, and each bit in the second bitmap corresponds to a piece of access information, wherein the value of the bit is used for indicating whether a terminal with the access information corresponding to the bit is allowed to perform the 2-step random access process.

* * * * *